United States Patent [19]

Yoshii et al.

[11] 4,393,115
[45] Jul. 12, 1983

[54] MULTILAYERED POLYPROPYLENE FILM

[75] Inventors: Toshiya Yoshii, Ohtsu; Satoru Nakura, Kusatsu; Masatsugi Murakami, Moriyama, all of Japan

[73] Assignee: Toray Industries, Tokyo

[21] Appl. No.: 283,380

[22] Filed: Jul. 15, 1981

[30] Foreign Application Priority Data

Jul. 22, 1980 [JP] Japan .............................. 55-100228

[51] Int. Cl.³ .......................... B32B 5/16; B32B 27/32
[52] U.S. Cl. ..................................... 428/323; 428/215;
428/216; 428/325; 428/328; 428/329; 428/330;
428/331; 428/332; 428/336; 428/343; 428/354;
428/349; 428/515; 428/516; 428/523; 428/910
[58] Field of Search ............... 428/516, 910, 323, 325,
428/328, 329, 330, 331, 215, 216, 515, 523, 336,
332, 343, 354, 349

[56] References Cited

U.S. PATENT DOCUMENTS

| 3,515,626 | 6/1970 | Duffield | 428/910 |
| 3,887,745 | 6/1975 | Yoshii | 428/516 |
| 4,132,050 | 6/1979 | Young | 428/516 |

FOREIGN PATENT DOCUMENTS

| 47-46466 | 11/1972 | Japan | 428/910 |
| 55-93450 | 7/1980 | Japan | 428/516 |

Primary Examiner—Ellis P. Robinson
Attorney, Agent, or Firm—Austin R. Miller

[57] ABSTRACT

Laminating a stretched thin propylene-ethylene block copolymer layer onto a surface of a laminate film hving a biaxially oriented polypropylene layer and a polypropylene layer uniaxially oriented only in the width direction. The resulting film has improved hand-cutting properties and the surface accepts wiring or drawing and is especially advantageous for use as adhesive tape.

20 Claims, 5 Drawing Figures

MULTILAYERED POLYPROPYLENE FILM

BACKGROUND OF THE INVENTION

Films have been proposed, for example, in U.S. Pat. No. 3,887,745, having a biaxially oriented polypropylene layer and a uniaxially oriented polypropylene layer which is oriented only in the direction of film width. Such films have also been used as adhesive tapes employing the film as the support material. However, known films (or adhesive tapes) have disadvantages including inadequacy as to hand-cutting properties and drawing properties, and inability to provide clear and definite copies.

The present invention has, as an important object, preparation of an improved film and adhesive tape employing said improved film as a support material. More specifically, inadequacy as to hand-cutting properties causes appreciable inconvenience when the film is applied to stationery or home uses, since difficulties in hand-cutting imply difficulties in use. In the case of adhesive tape, tape dispensers provided with zigzag blades are employed in many cases, but ease of cutting with the dispenser is approximately proportional to that by hand. In other words, tapes which are readily cut by hand are also easy to cut with the dispenser. Laminated film composed of biaxially oriented and uniaxially oriented layers can be cut by hand with effort, but its cutting properties are not very good. Thus, such films are sometimes cut incorrectly even when the dispenser is used.

It has now been discovered that hand-cutting properties may be remarkably improved when a layer of propylene-ethylene block copolymer, (referred to as PEBC hereinafter) whether stretched uniaxially or biaxially, is laminated onto one surface of a laminate film composed of biaxially oriented and uniaxially oriented layers.

Moreover, since the PEBC layer exhibits excellent receptivity to writing or drawing when stretched, it is possible to draw or write on the resulting film. Indeed, adhesive tape having this film as the support material may be written upon clearly with either a pencil or a ball-point pen. Furthermore, if the PEBC layer is provided as a thin layer it transmits light with minimized irregular reflection. Thus, even when this film is stuck on or over a paper containing printed matter and the paper plus tape are subjected to copying, the film itself is not copied. Therefore a clear copy of the printed matter may be made without any reproduction of the adhered film. Suitability for copying as described above is one of the most important characteristics of the film, especially when adhesive tape having this film as the support material is used for mending breakage or tears in books, notebooks or the like.

By providing a thin PEBC layer on one surface of a laminate layer composed of the biaxially oriented and uniaxially oriented layers, its hand-cutting properties have been substantially improved, with simultaneous gain of highly desirable drawing properties and excellent suitability for copying. Moreover, adhesive tape having this film as the support material is extremely well suited to stationery uses and for general end uses at home.

SUMMARY OF THE INVENTION

Accordingly, it is an important object of the present invention to provide an adhesive tape which has the characteristics described above. These and other objects, features and advantages of the present invention will become apparent and be more fully understood by the following detailed description of the invention.

The present invention is characterized in that a thin stretched PEBC layer is laminated onto one surface of a laminated film composed of a biaxially oriented layer and a uniaxially oriented layer. For preparing adhesive tape by employment of a film as described above, a layer of adhesive agent is provided on the surface of the laminate film opposite to the PEBC layer.

DETAILED DESCRIPTION OF THE INVENTION

The multilayered polypropylene film according to the present invention is particularly characterized in that the PEBC layer (i.e., the layer of propylene-ethylene block copolymer stretched uniaxially or biaxially) is laminated onto one surface of a laminated film composed of a biaxially oriented layer and a uniaxially oriented layer.

Figure 1:
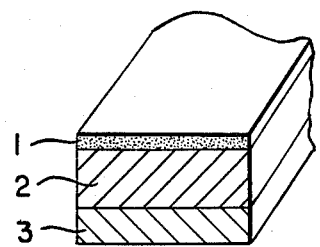
Figure 2:
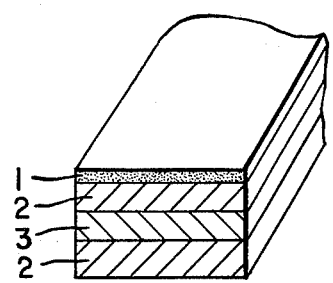
Figure 3:
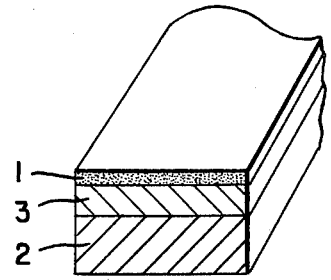
Figure 4:
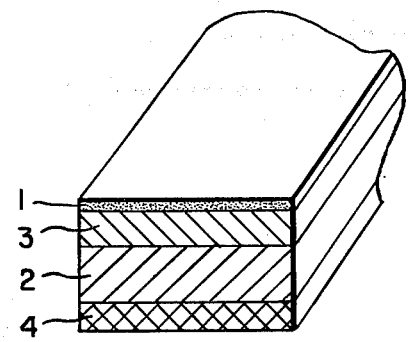
Figure 5:
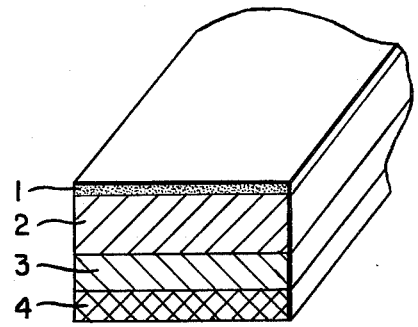

One preferred embodiment of the present invention will be described hereinbelow with reference to the accompanying drawings, in which:

FIGS. 1 through 3 are fragmentary perspective views showing, in section, the structures of improved films according to the present invention, and FIGS. 4 and 5 are fragmentary perspective views showing, in section, structures of adhesive tapes employing films of FIGS. 1 and 3 as support materials.

In FIGS. 1 through 5, the PEBC layer is represented by the numeral 1, the uniaxially oriented layer by the numeral 2, the biaxially oriented layer by the numeral 3, and adhesive layer by the numeral 4.

The PEBC employed in the practice of the present invention is a so-called block copolymer in which propylene and ethylene are subjected to copolymerization as in a block. In practicing the present invention, it is essential to employ a block copolymer, since random copolymers do not provide the superior effects that are achieved according to the present invention. In other words, none of the unique effects of the present invention can be achieved by the use of random copolymers.

A simple way to distinguish a random copolymer from a block copolymer is to check for the presence of absorption of 720 cm$^{-1}$ attributable to ethylene in an infra-red absorption spectrum of said copolymers. If absorption of 720 cm$^{-1}$ as stated above is detected, the copolymer in question is a block copolymer. In the case of a random copolymer, only a single absorption at 731 cm$^{-1}$ resulting from the propylene chain is noticed, without any absorption being detected at 720 cm$^{-1}$. Needless to say, when the amount of copolymerization of ethylene is small, even the block copolymer does not show perfect single absorption of 720 cm$^{-1}$, sometimes presenting absorption in a shoulder-like form. Even in such a case, however, the copolymer should be regarded as a block copolymer if any absorption is noticeable at 720 cm$^{-1}$. A block copolymer particularly suitable for the present invention is one in which the ratio of the absorbance A at 720$^{-1}$ to the absorbance B at 731$^{-1}$ is in the range of about 0.4 to 3.0 and more preferably in the range of about 0.6 to 2.0. If the value A/B is below the minimum values in the above ranges, the advantages of the present invention may be reduced due to the approach toward a random copolymer, while on the contrary, if the value A/B exceeds the maximum values stated in the ranges, the favorable effects of the present invention may also become reduced, since the influence of the ethylene chain becomes excessive. Meanwhile, the ethylene content in the PEBC should suitably be in the range of about 5 to 40%, preferably about 10 to 30%, on the basis of the weight of the copolymer as a standard. When the ethylene content exceeds or falls short of the foregoing ranges, the benefits of the present invention are reduced.

The ethylene content in the copolymer may be measured with the use of an infra-red ray absorbing spectrum based on the absorbance ratio of 900 cm$^{-1}$ to 720 cm$^{-1}$. When inorganic fine particles are added, the improvement of the hand-cutting properties and the drawing receptivity may further be enhanced. The particle sizes are preferably in the range of about 0.1 to 10 $\mu$m, and more preferably, in the range of about 0.5 to 5 $\mu$m. The amounts of such particles added into the PEBC are preferably about 5 to 40% by weight, and more preferably about 10 to 30% by weight.

Suitable inorganic fine particles include those of calcium carbonate, magnesium oxide, alumina, silica, aluminum silicate, kaolin, kaolinite, talc, clay, diatomite, dolomite, titanium oxide, zeolite, etc. If the amount added is less than the minimum values specified in the above ranges, the effect of the addition is hardly noticed, while on the contrary, if the amount added exceeds the maximum values suitability for use in copying deteriorates.

In some cases the hand-cutting properties and drawing receptivities are effectively improved by the addition of other polymers such as polyethylene, polybutene-1, poly (4 methylpentene-1), propylene-ethylene rubber, propylene-ethylene-diene terpolymer rubber, polybutadiene, polystyrene, polyethylene terephthalate, poly ($\epsilon$-caprolactam), etc. These are mixed into the PEBC in any desired fashion. One polymer which is particularly suitable for mixing into the PEBC is polyethylene, preferably in the range of about 1 to 30% and more preferably about 2 to 20% based on the weight of the PEBC as a standard. Exceeding or falling short of the above ranges will reduce the effect of improvement of hand-cutting properties and drawing receptivities. Meanwhile, in some cases the hand-cutting properties and drawing receptivities are further improved by mixing organic peroxides into the PEBC in the range of about 0.001 to 1%, based on the weight of the PEBC as a standard. Examples of suitable peroxides include benzoyl peroxide, t-butyl peroxybenzoate, dicumyl peroxide, lauroyl peroxide, etc. If the amount of organic peroxide added is less than those specified as minima in the above ranges, little effect is realized, while with additions exceeding the maxima in the above ranges difficulties are encountered in formation of the film, since the melt fluidity of the PEBC tends to deteriorate. Subsequently, it is necessary that the PEBC layer be stretched uniaxially or biaxially. The beneficial effects of the present invention, such as improvement of hand-cutting properties and receptivity and suitability for copying, etc. can be achieved only through stretching. The stretch ratio should suitably be in the range of about 3 to 12, more preferably about 5 to 10 in the case of uniaxial stretching. In the case of biaxial stretching, the stretch ratio should suitably be about 30 to 70 and more preferably, about 40 to 60 times, expressed as area ratios.

Moreover, it is extremely desirable that the thickness of the PEBC layer be in the range of about 0.5 to 8.0 $\mu$m and more preferably about 1.0 to 5.0 $\mu$m. If the thickness is less than the lower values stated in the ranges, improvements of hand-cutting properties and drawing receptivity are greatly reduced. On the contrary, if the thickness exceeds the above ranges, suitability for copying use deteriorates.

It should be noted that the biaxially oriented layer constituting the laminate film according to the present invention is one which exhibits a biaxially oriented pattern in the X-ray diffraction diagram. Its refractive index as measured by light having a wavelength of 589 $\mu$m should have values larger than 1.501 and more preferably, larger than 1.505, both in the longitudinal and transverse directions of the film. Meanwhile, a uniaxially oriented layer is one exhibiting a uniaxially oriented pattern in the X-ray diffraction diagram, and its refractive index as measured by light having a wavelength of 589 m$\mu$ should have values smaller than 1.505 in the longitudinal direction of the film, and larger than 1.510 in the transverse direction of the film.

Materials which may be employed for the biaxially oriented layer are propylene homo-copolymers or copolymers of propylene and other $\alpha$-olefins having 2 to 10 carbon atoms. In the case of copolymers, the amount of $\alpha$-olefin subjected to copolymerization is less than 5% based on the weight of the copolymer as a standard. If the amount of copolymer exceeds this level, the biaxially oriented layer becomes too soft, with consequent insufficient service strength of the laminate film. Into the biaxially oriented layer, various additives may be introduced (normally in the range of 0.01 to 2% on the basis of weight of the biaxially oriented layer as a standard). These include various additives known as additives for polypropylene, for example, stabilizers, antioxidants, ultra-violet absorbers, plasticizers, antistatic agents, anti-blocking agents, organic lubricants, pigments, coloring agents, nucleating agents, etc. Similarly, other kinds of polymers known as suitable for mixing into polypropylene may be added, for example, polyethylene, polybutene-1, poly (4-methylpentene-1), etc. These may be added for mixing in an amount of about 0.1 to 5% on the basis of the weight of the biaxially oriented layer.

The thickness of the biaxially oriented layer should normally be in the range of about 5 to 20 $\mu$m and more preferably, in the range of about 8 to 15 $\mu$m. If it is thinner than the lower limits of the above ranges, the service strength of the laminate film becomes insufficient, while on the contrary, if the thickness exceeds the upper limits of the above ranges, the hand-cutting properties of the laminate film deteriorate.

Subsequently, for the materials to be used for a uniaxially oriented layer constituting a laminate film according to the present invention, a propylene homopolymer or copolymer of propylene or other $\alpha$-olefins having 2 to 10 carbon atoms may be employed. In the case of a copolymer, the amount of $\alpha$-olefin to be subjected to copolymerization should be less than about 5% on the basis of the weight of the copolymer as a standard. If the amount of copolymerization exceeds this level, the uniaxially oriented layer becomes too soft, with consequent deterioration of hand-cutting properties of the laminated film. Regarding additives and other kinds of polymers, the items described earlier with reference to the biaxially oriented layer may be applied as they are. For overcoming the tendency of the laminated film to curl, it is effective to employ as the uniaxially oriented layer one or more polymers having melting points that are about 0.5° to 10° C. higher than those of the polymers used for the biaxially oriented layer. Such melting points may be measured as disclosed in detail in U.S. Pat. No. 3,887,745, for example.

The thickness of the uniaxially oriented layer should most desirably be in the range of about 1.2 to 5.0 times, more preferably about 1.5 to 3.0 times that of the biaxially oriented layer. If the uniaxially oriented layer is thinner than the lower limits of the above ranges, the hand-cutting properties of the laminate film tend to degrade, while on the contrary, if it is thicker than the upper limits of the above ranges, the laminate film undesirably becomes readily stretched in the longitudinal direction, resulting in insufficient service strength. It is to be noted that, as shown in FIG. 2, where two uniaxially oriented layers are present in the laminated film, the total thickness of these two layers should be regarded as the thickness of the uniaxially oriented layer. Furthermore, the total thickness of the laminated film according to the present invention comprising the PEBC layer, the biaxially oriented layer and the uniaxially oriented layer should desirably be in the range of about 15 to 60 $\mu$m and more preferably, in the range of about 20 to 50 $\mu$m. When the total thickness becomes thicker than the upper limits of the above ranges, the hand-cutting properties undesirably deteriorate. On the contrary, if the total thickness is less than the lower limits of the above ranges, insufficient service strength of the laminated film may result.

The multilayered film according to the present invention having the structure as described in the foregoing portions of this specification can be readily cut by hand in the widthwise direction, with the cutting line thereof extending straightly only in the widthwise direction. Moreover, on the surface of the PEBC layer of this film, letters and pictures, etc. may readily be written or drawn by use of a pencil, ball-point pen or the like. The letters, pictures and the like written or drawn on this film may be copied to produce clear and definite copies by conventional diazo type and electronic type copying devices. Meanwhile, even when the film is adhered over printed letters or pictures through the film, dark shades or the like of this film are not visible on the copied product, thus presenting clear copies. In the above case, it is necessary that the film surface contacting the printed matter should be arranged to be the surface thereof other than that of the PEBC layer (i.e. either the biaxially oriented layer or the uniaxially oriented layer). If the film is applied with its PEBC layer contacting the printed matteer in a reverse manner, the dark shade of the film itself may appear when the copy is taken, thus tending to soil the resultant copies.

By providing an adhesive layer on one surface of the multilayered film composed of the PEBC layer, the biaxially oriented layer and the uniaxially oriented layer, it is possible to prepare an adhesive tape. In this case, the adhesive agent must be applied to the surface (i.e. either the biaxially oriented layer or the uniaxially oriented layer) opposite to the PEBC layer. In many cases, better results may be obtained by preliminarily activating the surface to be applied with the adhesive agent, by using known surface treating processes such as corona discharge treatment. Meanwhile, known anchor coating agents may be applied for increasing the bond strength between the film surface and the adhesive surface. In connection with the above, the adhesive agents to be applied are not particularly limited, and conventional bonding agents mainly composed of natural rubber, synthetic rubber, polyvinyl ether, and acrylic ester copolymer or ethylene acetate vinyl copolymer, etc. may be employed therefor. Similarly, adhesive agents of the hot-melt type or the water emulsion type may also be adopted. Meanwhile, the surface (i.e. the PEBC layer surface) opposite to the adhesive surface need not necessarily be treated, but if required may be treated for activation by such as corona discharge treatment, or treated with the known releasing agents. The adhesive tape according to the present invention to be obtained in the manner as described above can readily be cut by hand or by a dispenser, with simultaneous superior drawing properties and suitability for copying. Therefore, the product of this invention is not only convenient as a mending tape for stationery goods or books, but is readily applicable to various end uses at home in general.

Hereinbelow, one preferred embodiment for preparing a multilayered film and an adhesive tape employing said multilayered film as the support material according to the present invention will be described. In the first place, raw materials to be employed for this example are those having compositions as follows.

Material (I):
Propylene-ethylene block copolymer. Ethylene content was 20%. Its absorption ratio of 720 cm$^{-1}$ and 731 cm$^{-1}$ in the infrared absorption spectrum was 1.28. It contained 20% of calcium carbonate fine particles, and contained 10% of low density polyethylene and 0.02% of benzoyl peroxide. (All percentages are based on the weight of the copolymer as a standard).

Material (II):
Polypropylene homopolymer. Melt flow index as measured under the conditions L of ASTM D1238-73 was 2.5 g/10 minutes. Melting point 168° C.

Material (III):
Propylene homopolymer. Melt flow index was 5.5 g/10 minutes. Melting point 169.2° C.

First, a sheet composed of two layers was produced by co-extruding the above materials (I) and (II). The sheet thus prepared was stretched by 5.0 times in the longitudinal direction, while being heated at 130° C. Subsequently, the material (III) was subjected to melt extrusion onto the surface of the material (II) for lamination. The three-layered sheet thus prepared was fed into a stenter and was stretched 9 times in the widthwise direction while being heated at 155° C., and after subsequent heat treatment for 5 seconds at 158° C., was cooled and wound up. The resultant three-layered film thus obtained had such a construction that the material (I) formed the PEBC layer, the material (II) at the core constituted the biaxially oriented layer and the material (III) at the opposite surface (III) formed the uniaxially oriented layer. Regarding the thickness of the respective layers, that of the PEBC layer was 3.0 $\mu$m, the biaxially oriented layer 10 $\mu$m, and the uniaxially oriented layer 27 $\mu$m, with the total thickness being 40 $\mu$m. This film could be readily but by hand in the widthwise direction, and moreover, it was superior in drawing properties and also in suitability for copying.

For producing an adhesive tape according to the present invention, the surface of the uniaxially oriented layer of the above film was treated by corona discharge, and after applying thereto an anchor coating agent mainly composed of a mixture of melamine-formaldehyde resin and alkyl resin, with subsequent drying, was further treated with an adhesive agent mainly composed of an acrylic group copolymer, and was then dried and wound up onto a paper core. By slitting the wound roll into ring-shaped pieces 0.5 inch in width, the resulting adhesive tape was obtained. Since this adhesive tape could easily be cut by hand or with a dispenser, and was further superior in drawing properties and in suitability for copying, it was conveniently used as a mending tape for stationary goods and home use items, etc. and also as a sealing tape for various purposes.

Hereinbelow, examples are inserted for the purpose of illustrating the present invention, without any intention of limiting the scope thereof.

EXAMPLE 1

The following three kinds of raw materials were prepared. (All of the percentages are based on the weight of each raw material as a standard).

Material (I):
Propylene-ethylene block copolymer. Ethylene content 23%. Absorption ratio of 720 cm$^{-1}$ and 731 cm$^{-1}$ in the infrared absorption spectrum was 1.36. Melt flow index as measured under the conditions L of ASTM D1238-73 was 5.5 g/10 minutes. It contained the following anti-oxidant and plasticizer.

2,6-di-tert-butyl-p-cresol: 25%
Irganox 1010 (manufactured by Ciba-Geigy Ltd.): 0.05%
Calcium stearate: 0.20%

Material (II):
Propylene homopolymer. Melt flow index was 3.0 g/10 minutes. Melting point 168.2° C. It contained the same anti-oxidant and plasticizer as in material (I).

Material (III):
Propylene homopolymer. Melt flow index 7.2 g/10 minutes. Melting point 169.7° C.
It contained the following additives in addition to the same anti-oxidant and plasticizer as those in the material (I).

Monoglyceride of stearic acid: 0.8%
N, N-dihydroxyethyl stearylamine: 0.2%
Stearylamide: 0.15%
Kaolinite fine particles (average particle diameter 1.5 μm): 0.08%

The materials (I) and (II) were fed into separate extruders for melting at 260° C., and each of the molten materials was led into one sheet forming die, in which the two molten polymers were combined so as to be discharged from the die in the form of a two-layered sheet. The molten sheet was cooled and solidified on the drum having a surface temperature of 30° C. The two-layered sheet was heated by pre-heating rollers up to 120° C., and subsequently stretched 4.8 times in the longitudinal direction while being rapidly heated by an infra-red ray heater. On the surface of the above uniaxially stretched sheet at the side of the material (II), the material (III) melted at 280° C. was laminated through extrusion, and thus a three-layered sheet was obtained. The three-layered sheet thus prepared was fed into a stenter type lateral stretcher, and, after being stretched 9 times in the widthwise direction while being heated at 156° C., was led into a heat treating room kept at 158° C. for heat treatment for 5 seconds, with relaxation of 8% in the widthwise direction being permitted, so as to be subsequently slowly cooled down to room temperature. The total thickness of the three-layered film thus obtained was 40 μm, including a PEBC layer of 3 μm composed of the material (I), a biaxially oriented layer of 9 μm composed of the material (II) and a uniaxially oriented layer of 28 μm composed of the material (III).

The surface of the PEBC layer of this film was cloudy or opaque, with the average surface roughness (HCLA) as measured by the method described in ASA B46, 1-1962 being 0.58 μm (the cut-off during the measurement was 0.25 mm). On this surface, letters and the like could be written or drawn with a pencil or ball-point pen, and moreover, these letters were clearly copied by use of a diazo type copying machine, etc. Meanwhile, even when the film was adhered over printed matter on paper, with the unilaterally oriented surface of said film contacting said printed matter, the film did not interfere with copying, and clear and definite copies were made. In connection with the above the Charpy impact strength, which is a parameter showing the quality of the hand-cutting properties of this film was 6.6 kg.cm/mm$^2$ for widthwise cutting.

If the Charpy impact strength of a film exceeds about 12 kg.cm/mm$^2$, the film is difficult to cut by hand. When the impact strength is in the range of 9 to 12 kg.cm/mm$^2$, the film may be cut by hand with difficulty but is still not as easy to cut as are cellophane and acetate films. When the impact strength is in the range of about 5 to 8 kg.cm/mm$^2$, the film is very easy to cut, and provides a good processability as well. However, if the Charpy value becomes smaller than about 4 kg.cm/mm$^2$, while it continues to be readily cut, it is not suitable for practical application because it is too brittle. Therefore, the preferred values for the Charpy impact strength of the film are in the range of about 5 to 8 kg.cm/mm$^2$.

The film thus prepared was treated, on its both surfaces, by corona discharge to obtain a surface wetting tension of 40 dyne/cm$^2$. Subsequently, an organic solvent solution of an anchor coating agent mainly composed of acrylonitrile-butadiene-styrene copolymer and polyterpene resin was applied onto the uniaxially oriented surface and dried by heated air flow at 60° C. In the next step, a releasing agent solution (a toluene solution of the reaction product between N-octadecyl isocyanate and polyvinyl alcohol) was applied onto the surface of the PEBC layer and was similarly dried at 60° C. Thereafter, an organic solvent solution of an adhesive agent mainly composed of a copolymer of iso-octyl acrylate and acrylic acid was applied onto the anchor coating agent. After drying at 60° C., the film was wound onto a paper core.

The film thus wound was then slit into ring-shaped pieces together with the paper core. Thus, adhesive tape 0.5 inch in width was obtained. The Charpy impact strength when the above tape was cut in the widthwise direction was 6.0 kg.cm/mm$^2$, and the tape could readily be cut by hand, and also by a dispenser having a zigzag blade. On the non-adhesive side of this tape, letters and the like could easily be written with a pencil or a ball-point pen, and it was also easy to copy the written letters. A printed paper which had been taped together with this tape was subjected to copying. There was no distortion or darkening of the tape area on the copy, and clear and accurate copies were obtained.

COMPARATIVE EXAMPLE 1

Except that the PEBC layer was removed from the film of Example 1, a laminated film 40 μm in thickness composed of a biaxially oriented layer and a uniaxially oriented layer was prepared in exactly the same manner as in Example 1. The thickness of the biaxially oriented layer was 12 μm and the thickness of the uniaxially oriented layer was 28 μm.

With the film employed as the support material, adhesive tapes were prepared in the same manner as in Example 1. Accordingly, the above Comparative Example is similar to the method disclosed in U.S. Pat. No. 3,887,745. The Charpy impact strength of this tape during cutting in the widthwise direction was 9.5 kg.cm/mm², showing the hand-cutting properties to be considerably inferior to the tape of Example 1 herein. Moreover, the above tape was lacking in drawing properties, and was also inferior in regard to suitability for copying.

COMPARATIVE EXAMPLE 2

Except that the PEBC (block copolymer) for the material (I) in Example 1 was replaced by a propylene-ethylene random copolymer (the absorbance ratio of 720 cm$^{-1}$ and 731 cm$^{-1}$ in the infra-red absorption spectrum was 0), an adhesive tape was prepared, with other conditions being the same as those in Example 1. The Charpy impact strength of this tape was 11.5 kg.cm/mm², and the hand-cutting properties of the tape were considerably inferior. Moreover, this tape was lacking in drawing properties and had inferior suitability for copying.

EXAMPLE 2

The following three kinds of raw materials were prepared (all of the percentages are based on the weight of each raw material as a standard).

Material (I):
  Propylene-ethylene block copolymer. Ethylene content 20%. Absorption ratio of 720 cm$^{-1}$ and 731 cm$^{-1}$ in the infra-red absorption spectrum was 1.15. Melt flow index was 6.5 g/10 minutes.
  Containing additives as follows:
    Low density polyethylene: 8%
    Aluminum silicate fine particles (Average particle diameter 1.6 μm): 20%
    Dicumyl peroxide: 0.02%
    Magnesium oxide: 0.05%
    2,6-di-tert-butyl-p-cresol: 0.25%
    Irganox 1010 (manufactured by Ciba-Geigy Ltd.): 0.05%
    Calcium stearate: 0.20%
Material (II):
  Propylene homopolymer. Melt flow index 25 g/10 minutes.
  Melting point 168° C.
  Containing the following additives:
    Monoglyceride of stearic acid: 0.6%
    N,N-dihydroxyethyl stearylamine: 0.15%
    Oleic amide: 0.10%
    Irganox 1010 (manufactured by Geigy Ltd.): 0.05%
    Calcium stearate: 0.20%
Material (III):
  Propylene homopolymer. Melt flow index 7.5 g/10 minutes.
  Melting point 169.8° C.
  Containing 0.1% of zeolite fine particles (average particle diameter 1.8 μm) in addition to the same additives as in material (II)

The material (II) was fed into an extruder for melt extrusion at 280° C. into sheet-like form and was then wound onto a rotary drum having a surface temperature of 40° C. for cooling and solidification. The sheet thus prepared was heated up to 130° C. for stretching at a ratio of 5.0 in the longitudinal direction, forming a uniaxially stretched sheet. The material (I) and material (III) were subjected to melt extrusion respectively onto the upper and lower surfaces of the above sheet for lamination to form a three-layered sheet, which was then fed into a stenter type lateral stretcher and stretched at a ratio of 9.2 in the widthwise direction, while being heated at 153° C. The film thus treated was subsequently fed into a heat treating room for heat treatment at 155° C. for 4 seconds, while allowing 10% relaxation in the widthwise direction and was thereafter led into a cooling chamber kept at 20° C. for gradual cooling. The resulting three-layer film had a total thickness of 35 μm, including a PEBC layer of 3 μm composed of material (I) a biaxially oriented layer of 8 μm composed of material (II) and a uniaxially oriented layer of 24 μm composed of material (III). The surface of the PEBC layer of this film was cloudy or opaque, with an average surface roughness (HCLA) of 0.70 μm. On this surface, legible characters could easily be written or drawn with a pencil or ball-point pen, and moreover, these letters were capable of being clearly copied by diazo type copying machines, etc. Even when the film was adhered to printed matter, with the uniaxially oriented surface of said film contacting the printed matter, the tape did not interfere with copying, thus providing clear and definite copies. The Charpy impact strength during cutting of this film in the widthwise direction was 5.9 kg.cm/mm², while extremely favorable hand-cutting properties were observed. The uniaxially oriented surface of the above film was treated by corona discharge in a nitrogen atmosphere, and then a toluene solution was applied. The toluene solution was composed of atactic polypropylene and butyl rubber and was subsequently dried by heated air at 80° C. Thereafter, an adhesive agent mainly composed of pale crepe and polyterpene was applied to the dried surface and the resulting film was wound onto a paper core after drying by heated air at 80° C. The film thus wound was slit together with the paper core into ring-shaped pieces so as to prepare adhesive tapes 0.5 inch in width. The tapes and Charpy impact strengths of 5.6 kg.cm/mm², and could be readily cut by hand or by a dispenser. On the non-adhesive side of this tape, letters and the like could easily be written or drawn, and such written letters, etc. were readily copied. Moreover, even when the torn portion of printed paper which had been taped together with the use of this tape was subjected to copying, no dark shade indicating the presence of the tape was observable in the copy. Thus, clear and definite copies were obtained.

Although the present invention has been described in detail by referring to the accompanying drawings, it should be noted that various modifications and changes will be apparent to those skilled in the art. Accordingly, unless such modifications and changes depart from the scope of the present invention, they are intended to be included as a part of the present invention.

We claim:

1. A multilayered polypropylene film capable of being readily cut by hand and having a surface which is capable of accepting writing or drawing thereon, which comprises a biaxially oriented polypropylene layer and a polypropylene layer uniaxially oriented in the direction of its width, and laminated upon at least one surface of said laminated film a propylene-ethylene block copolymer layer stretched uniaxially or biaxially.

2. A multilayered polypropylene film as claimed in claim 1, wherein the thickness of said polypropylene layer uniaxially oriented in the direction of width is in the range between about 1.2 and 5.0 times the thickness of said biaxially oriented polypropylene layer, and wherein the thickness of said block copolymer layer is in the range between about 0.5 and 8.0 μm, and wherein the total thickness of said multilayered polypropylene film is in the range between about 15 and 60 μm.

3. A multilayered polypropylene film as claimed in claim 1, wherein said propylene-ethylene block copolymer layer contains inorganic fine particles in an amount of about 5 to 40% by weight on the basis of the weight of said copolymer.

4. A multilayered polypropylene film as claimed in claim 3, wherein said percentage is about 10–30%.

5. A multilayered polypropylene film as claimed in claim 3, wherein said fine particles have sizes of about 0.1 to 10 μm.

6. A multilayered polypropylene film as claimed in claim 5, wherein said fine particles have sizes of about 0.5 to 5 μm.

7. A multilayered polypropylene film as claimed in claim 1, wherein said propylene-ethylene block copolymer has an ethylene content in the range of about 5 to 40% on the basis of the weight of said copolymer.

8. A multilayered polypropylene film as claimed in claim 7, wherein said ethylene content is about 10 to 30%.

9. A multilayered polypropylene film as claimed in claim 1, wherein said propylene-ethylene block copolymer layer further contains polyethylene in the range of about 1 to 30% on the basis of the weight of said copolymer.

10. A multilayered polypropylene film as claimed in claim 9, wherein the content of said polyethylene is about 2–20%.

11. A multilayered polypropylene film as claimed in claim 1, wherein said propylene-ethylene block copolymer contains organic peroxide in an amount of about 0.001 to 1.0% on the basis of the weight of said copolymer.

12. A multilayered polypropylene film as claimed in claim 1, wherein the block copolymer has a ratio of absorbence at 720 $cm^{-1}$ to absorbence at 731 $cm^{-1}$ of about 0.4 to 3.0.

13. A multilayered polypropylene film as claimed in claim 12, wherein said ratio is about 0.6 to 2.0.

14. A multilayered polypropylene film as claimed in claim 1, wherein said stretching is uniaxial and the stretch ratio is about 3–12.

15. A multilayered polypropylene film as claimed in claim 14, wherein said stretch ratio is about 5–10.

16. A multilayered polypropylene film as claimed in claim 1, wherein said stretching is biaxial and the stretch ratio is about 35–70 expressed as an area ratio.

17. A multilayered polypropylene film as claimed in claim 16, wherein said ratio is about 40–60.

18. A multilayered polypropylene film as claimed in claim 1, wherein the biaxially oriented polypropylene layer has a refraction index at 589 mμ above 1.501 in both the longitudinal and transverse directions of the film.

19. A multilayered polypropylene film as claimed in claim 18, wherein said index is above 1.505.

20. A multilayered polypropylene film as claimed in claim 1, wherein the uniaxially oriented polypropylene layer has a refraction index measured at a wavelength of 589 mμ smaller than 1.505 in the longitudinal direction and larger than 1.510 in the transverse direction.

* * * * *

UNITED STATES PATENT AND TRADEMARK OFFICE
CERTIFICATE OF CORRECTION

PATENT NO. : 4,393,115
DATED : 7/12/83
INVENTOR(S) : Toshiya Yoshii; Satoru Nakura and Masatsugi Murakami It is certified that error appears in the above-identified patent and that said Letters Patent is hereby corrected as shown below:

In the Abstract, line 2, delete "hving" and insert --having--
line 6, delete "wiring" and insert --writing--.
Column 6, line 57, delete "but" and insert --cut--.

Signed and Sealed this

Seventh Day of May 1985

[SEAL]

*Attest:*

DONALD J. QUIGG

*Attesting Officer*     *Acting Commissioner of Patents and Trademarks*